United States Patent
Zhao et al.

(10) Patent No.: US 12,280,628 B1
(45) Date of Patent: Apr. 22, 2025

(54) WHEEL ACTION-BASED ACTIVE SUSPENSION DAMPING ADJUSTMENT APPARATUS AND METHOD

(71) Applicant: YANSHAN UNIVERSITY, Qinhuangdao (CN)

(72) Inventors: Dingxuan Zhao, Qinhuangdao (CN); Haiwu Zheng, Qinhuangdao (CN); Hao Xiong, Qinhuangdao (CN); Ziqi Huang, Qinhuangdao (CN); Zhuangding Zhou, Qinhuangdao (CN); Zeping Li, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 19/001,462

(22) Filed: Dec. 25, 2024

(30) Foreign Application Priority Data

Dec. 26, 2023 (CN) .......................... 202311802023.X

(51) Int. Cl.
*B60G 17/0195* (2006.01)
*B60G 17/016* (2006.01)
(Continued)

(52) U.S. Cl.
CPC ....... *B60G 17/0195* (2013.01); *B60G 17/016* (2013.01); *G05B 13/027* (2013.01);
(Continued)

(58) Field of Classification Search
CPC .............. B60G 17/0195; B60G 17/016; B60G 2202/24; B60G 2400/10; B60G 2400/204;
(Continued)

(56) References Cited

U.S. PATENT DOCUMENTS

2014/0265560 A1   9/2014  Leehey et al.
2017/0240017 A1*  8/2017  Vandersmissen ...... B60G 17/06
(Continued)

FOREIGN PATENT DOCUMENTS

CN    206258581 U      6/2017
CN    108698464 A     10/2018
KR    102487860 B1 *   1/2023

OTHER PUBLICATIONS

English translation of Park (KR 102487860) (Year: 2023).*

*Primary Examiner* — James M McPherson
*Assistant Examiner* — Kyle J Kingsland

(57) ABSTRACT

A wheel action-based active suspension damping adjustment apparatus recognizes wheel actions through a steering apparatus, distance measuring apparatuses and force sensors and calculates an action damping magnitude according to damping parameters determined by different wheel actions, thereby achieving optimal adjustment under different actions. The changes in an inclination angle of a vehicle cabin floor and a vertical acceleration are monitored by using an inclination angle sensor and acceleration sensors, and meanwhile, an inclination angle damping and an acceleration damping are determined according to exceeding amplitudes, and a total damping of active suspensions is fed back and corrected, thereby further enhancing an adjustment and control effect of the active suspensions. According to the method, basic damping, action damping, inclination angle damping and acceleration damping data is output and recorded, and classified according to a vehicle state and the wheel actions, data changes under a same classification are compared.

7 Claims, 6 Drawing Sheets

(51) Int. Cl.
*B60W 10/20* (2006.01)
*B60W 10/22* (2006.01)
*B60W 50/00* (2006.01)
*G05B 13/02* (2006.01)

(52) U.S. Cl.
CPC ...... *B60G 2202/24* (2013.01); *B60G 2400/10* (2013.01); *B60G 2400/204* (2013.01); *B60G 2400/41* (2013.01); *B60G 2500/10* (2013.01); *B60G 2500/40* (2013.01); *B60G 2800/22* (2013.01); *B60W 10/20* (2013.01); *B60W 10/22* (2013.01); *B60W 50/00* (2013.01); *B60W 2050/0028* (2013.01); *B60W 2510/182* (2013.01); *B60W 2510/20* (2013.01); *B60W 2520/10* (2013.01); *B60W 2710/207* (2013.01); *B60W 2710/226* (2013.01)

(58) Field of Classification Search
CPC ............ B60G 2400/41; B60G 2500/10; B60G 2500/40; B60G 2800/22; G05B 13/027; B60W 10/20; B60W 10/22; B60W 50/00; B60W 2050/0028; B60W 2510/182; B60W 2510/20; B60W 2520/10; B60W 2710/207; B60W 2710/226
See application file for complete search history.

(56) References Cited

U.S. PATENT DOCUMENTS

| | | |
|---|---|---|
| 2019/0001782 A1 | 1/2019 | Anderson et al. |
| 2019/0381998 A1* | 12/2019 | Anderson ............... B60G 17/02 |
| 2022/0306265 A1* | 9/2022 | Feng .......................... B63J 2/04 |
| 2022/0396330 A1 | 12/2022 | Doerksen et al. |

* cited by examiner

WHEEL ACTION-BASED ACTIVE SUSPENSION DAMPING ADJUSTMENT APPARATUS AND METHOD

CROSS-REFERENCE TO RELATED APPLICATIONS

This application claims priority to Chinese Patent Application No. 202311802023.X with a filing date of Dec. 26, 2023. The content of the aforementioned application, including any intervening amendments thereto, is incorporated herein by reference.

TECHNICAL FIELD

The present disclosure relates to the technical field of active suspension adjustment and control, and in particular, to a wheel action-based active suspension damping adjustment apparatus and method.

BACKGROUND

An automotive suspension system is a key to improve ride comfort and handling performance. The automotive suspension system can automatically adjust the stiffness and damping of suspensions according to the road condition and the change in load of a vehicle to achieve optimum driving performance and comfort. In the past few decades, the adjustment and control of active suspensions has always been the focus of in-depth research in automotive engineering, and has been used in industry.

The existing active suspension system mainly includes a sensor, an electronic control unit, an actuator, and a suspension system. Firstly, the active suspension system monitors the driving state of the vehicle by sensors, e.g., information such as speed, acceleration, and load. The sensors transmit monitored data to the electronic control unit. After receiving the data transmitted by the sensors, the electronic control unit analyzes and processes the data, and judges the current driving state of the vehicle and the road surface condition. Then, according to the analysis result, the electronic control unit makes a corresponding control strategy to adjust the state of the suspension system, thereby improving the comfort and stability of the vehicle. Finally, the electronic control unit adjusts the suspension system in real time by the actuator. Instructions received by the actuator include parameters to adjust suspension stiffness, damping, etc. However, the current active suspension system still has a lot of non-negligible problems, and we summarize the following problems that need to be solved urgently:

1. Existing active suspension system control is too redundant in control solution, single in coping scene, and is relatively poor in effect of adjustment and control for a composite scenario of various driving road conditions; moreover, no consideration is given to the influence of adjustment and control errors due to different actions between different wheels, so that the corresponding active suspension apparatus cannot be cooperatively controlled.

2. In the existing active suspension system, the volume of data monitored by sensors is too large, for example, previewing monitored road surface information is too cumbersome in data processing, and cannot meet the requirement of quick response required in the actual driving process of the vehicle; some control solutions monitoring only vehicle information have relatively low data precision, resulting in an insignificant effect of adjustment and control.

3. The existing active suspension damping adjustment and control method cannot quantify the change in the performance of the active suspensions, and cannot give a corresponding prompt according to the change in the performance of the active suspensions.

Therefore, to solve the problems described above, there is an urgent need for a wheel action-based active suspension damping adjustment apparatus and method.

SUMMARY

For the problems described above, the present disclosure aims to provide a wheel action-based active suspension damping adjustment apparatus and method, thereby achieving optimal adjustment under different wheel actions; the total damping of active suspensions is fed back and corrected, thereby enhancing an adjustment and control effect of the active suspensions.

The present disclosure uses the following technical solutions:

A wheel action-based active suspension damping adjustment apparatus proposed by the present disclosure includes a vehicle body, a steering apparatus, wheels, brake apparatuses, a vehicle frame, distance measuring apparatuses, and active suspensions, the steering apparatus is arranged at a front end of the vehicle body, the vehicle frame is arranged below the steering apparatus, the brake apparatuses are arranged at two sides of the vehicle frame, the active suspensions are arranged at upper parts of the brake apparatuses, the wheels are arranged at one side of the active suspensions, and the distance measuring apparatuses are arranged in front of the wheels;

- the vehicle body includes a vehicle cabin floor, an inclination angle sensor, and acceleration sensors, the inclination angle sensor is arranged above the vehicle cabin floor, and the acceleration sensors are arranged around the inclination angle sensor;
- the steering apparatus includes a steering wheel, a steering gear, connecting rods, steering knuckles, and swing arms, the steering gear is arranged below the steering wheel, the connecting rods are arranged at two sides of the steering gear, the steering knuckles are arranged at one side of the connecting rods, and the swing arms are arranged at one side of the steering knuckles;
- the brake apparatuses each include a brake disc, a brake pad, and a force sensor, the brake pad is arranged at one side of the brake disc, and the force sensor acquiring a brake pad force is arranged at one side of the brake pad;
- the distance measuring apparatuses each include a base, a steering motor, a pitching motor, and a distance measuring sensor, the steering motor is arranged below the base, the pitching motor is arranged below the steering motor, and the distance measuring sensor is arranged at one side of the pitching motor; and
- the active suspensions each include a hydraulic damping regulator, a spring, and a hydraulic cylinder, the spring is arranged above the hydraulic damping regulator, and the hydraulic cylinder is arranged above the spring.

Further, the acceleration sensors are arranged right above the active suspensions, and the inclination angle sensor is arranged at a center of the vehicle cabin floor.

Further, the distance measuring apparatuses are mounted on the vehicle frame through a lead screw-polish rod structure and connected to the steering gear through lead screw-nut structures, and a motion track of the distance measuring apparatuses is controlled by the steering wheel, so that the distance measuring apparatuses are always located on the traveling track of the wheels.

A wheel action-based active suspension damping adjustment method includes the following steps:
S1: setting a basic damping according to an initial state:
S11: setting a basic damping Rsi of an active suspension on each wheel according to the initial state of a vehicle, a positional relationship of wheels in the vehicle and driving requirements, wherein i represents serial numbers of the wheels at different positions in the vehicle; and
S12: controlling a traveling track of the wheels by a steering apparatus, and driving distance measuring apparatuses to move above the traveling track of the wheels;
S2: setting an action damping according to a wheel action:
S21: a steering damping parameter
acquiring a wheel steering angle θ and a vehicle driving speed v, and determining a steering damping parameter rz according to numerical values of the wheel steering angle θ and the vehicle driving speed v;
S22: a brake damping parameter
acquiring a brake pad force f by a force sensor, and determining a brake damping parameter rf according to the brake pad force f;
S23: an obstacle surmounting damping parameter
controlling, by steering motors and pitching motors, a measurement area of distance measuring sensors of the distance measuring apparatuses to coincide with the traveling track, measuring a distance L between the distance measuring sensors and the traveling track, a ground clearance of the distance measuring sensors being D and obstacle height $d=D-L\times\sin\beta$, and determining an obstacle surmounting damping parameter rd according to the obstacle height d and the vehicle driving speed v; and
S24: the wheel action being one or more of S21 to S23, determining action damping $R_{di}=f(rz, rf, rd)$ according to acquired damping parameters, and determining total damping $R_i=R_{si}+R_{di}+\Delta R_{ki}+\Delta R_{zi}$ of active suspensions, where $\Delta Rki$ is an inclination angle damping and $\Delta Rzi$ is an acceleration damping;
S3: determining the inclination angle damping and the acceleration damping:
S31: outputting monitoring data of an inclination angle sensor and acceleration sensors;
S32: judging whether an inclination change of a vehicle cabin floor meets requirements according to inclination angle data, if not, determining an inclination angle damping $\Delta Rki$ according to an inclination angle exceeding amplitude, and jumping to S24 to correct the total damping Ri of the active suspensions; and
S33: judging whether the vehicle cabin floor meets steadiness requirements according to acceleration data, if not, determining an acceleration damping $\Delta Rzi$ according to an acceleration exceeding amplitude, and jumping to S24 to correct the total damping Ri of the active suspensions; and
S4: judging whether a vehicle motion state is terminated, if yes, ending, and if not, jumping to S1.

Further, in step S21, under a same wheel steering angle θ, an inside turning path and an outside turning path correspond to different steering damping parameters rz of the active suspensions of the wheels, represented as positive and negative respectively; and when only a steering action is present, action damping Rdi=f (rz, 0, 0), and action dampings of the active suspensions of inside and outside paths have a certain difference value, so that vehicle steering is steady.

Further, in step S22, under a same brake pad force f, front wheels and rear wheels of the vehicle correspond to different brake damping parameters rf of the active suspensions, represented as positive and negative respectively; and when only a brake action is present, action damping Rdi=f (0, rf, 0), and action dampings of the active suspensions of the front wheels and the rear wheels have a certain difference value, achieving better brake performance while ensuring steady vehicle braking.

Further, in step S24, for acquiring f (rz, rf, rd), firstly, a first simulation data set of action damping Rdi that meets adjustment and control requirements under actions of some wheels is calculated by a mathematical model, then, an experimental data set of action damping Rdi that meets actual requirements under the actions of the some wheels is acquired by experiments, the first simulation data set and the experimental data set are trained by a first neural network to obtain a first relational model between simulation data and experimental data, and a second simulation data set under actions of more wheels is calculated and combined with the first simulation data set to be trained by a second neural network to acquire a second relational model between wheel actions and simulation data; and when the action damping Rdi is calculated in actual, parameters rz, rf, and rd are input into the second relational model to obtain a simulation result, then the simulation result is input into the first relational model, and finally, the action damping Rdi adjusted and controlled in actual is determined.

Further, a vehicle state, the basic damping Rsi, the wheel action, the action damping Rdi, the inclination angle damping $\Delta Rki$ and the acceleration damping $\Delta Rzi$ are output respectively, and classified according to the vehicle state and the wheel actions to classify and record output damping numerical values, data changes under a same classification are compared, performance of the active suspensions is quantified, and a replacement prompt is given when the performance is reduced to a set threshold.

Compared with the prior art, the present disclosure has the following beneficial effects:

1. According to the method and apparatus of the present disclosure, the steering damping parameter is determined by the wheel steering angle and the vehicle driving speed, the brake damping parameter is determined by the brake pad force, the obstacle surmounting damping parameter is determined by the obstacle height and the vehicle driving speed, the wheel actions are recognized, and the action damping magnitude is calculated according to the damping parameters determined by different wheel actions, thereby achieving optimal adjustment under the different wheel actions.

2. According to the method and apparatus of the present disclosure, the inclination change and steadiness of the vehicle cabin floor are monitored by the inclination angle sensor and the acceleration sensors, meanwhile, the inclination angle damping and the acceleration damping are determined according to the exceeding amplitudes, and the total damping of the active suspensions is fed back and corrected, thereby further enhancing the adjustment and control effect of the active suspensions.

3. According to the method and apparatus of the present disclosure, the basic damping, action damping, inclination angle damping and acceleration damping data is output and recorded, and classified according to the vehicle state and the wheel actions, the data changes under the same classification are compared, the performance of the active suspensions is quantified, and finally, the fault prompt is given according to the change in the performance of the active suspensions.

Figure 1:
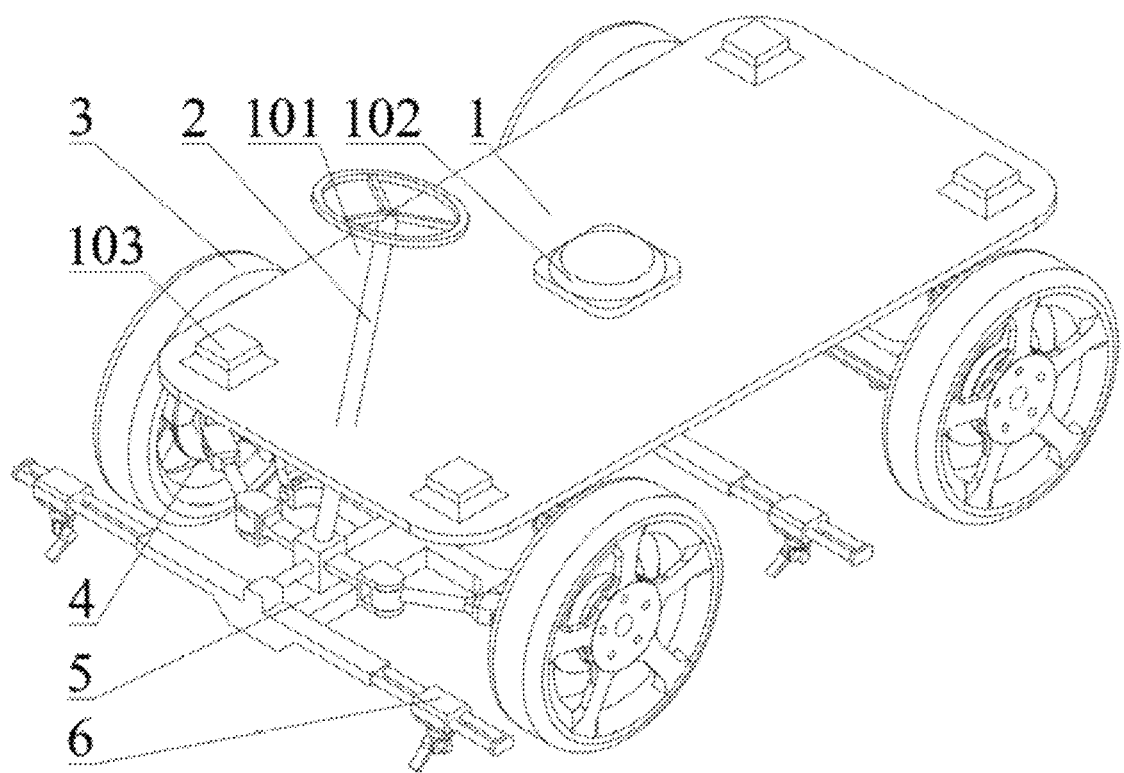
FIG. 1 is a schematic overall structural diagram of an apparatus of the present disclosure.
Figure 2:
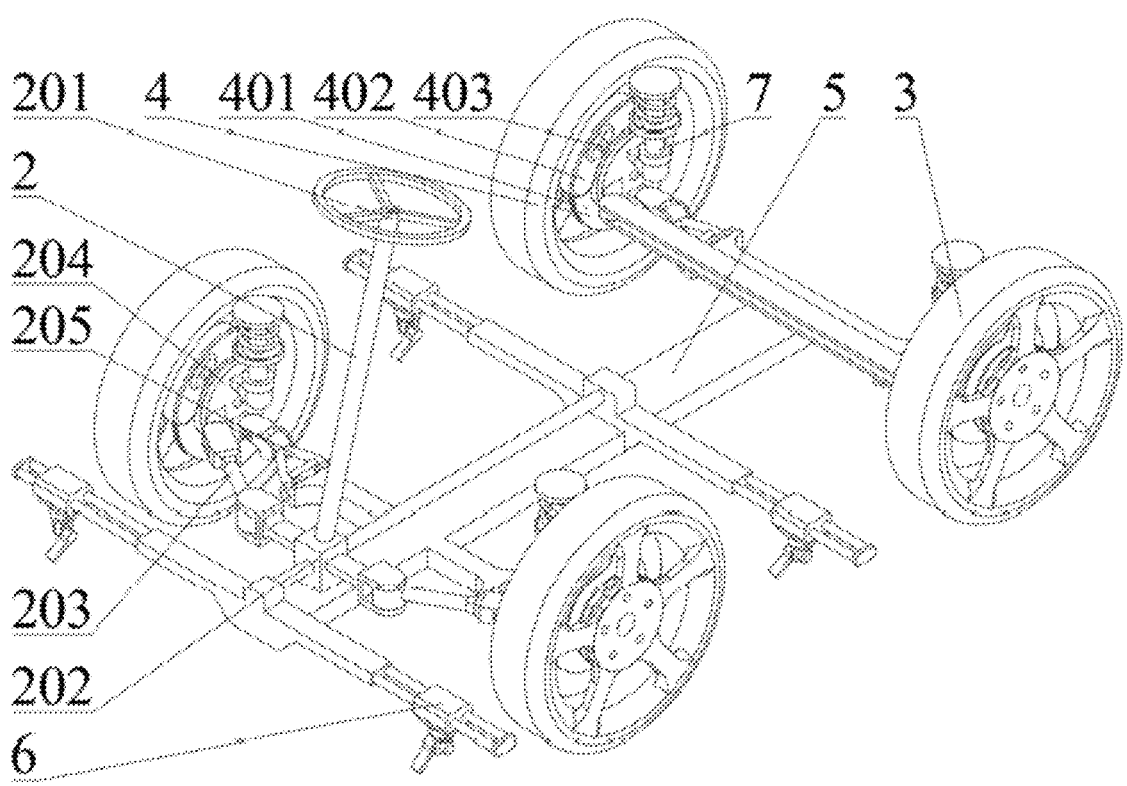
FIG. 2 is a schematic diagram of some apparatuses in an apparatus of the present disclosure.
Figure 3:
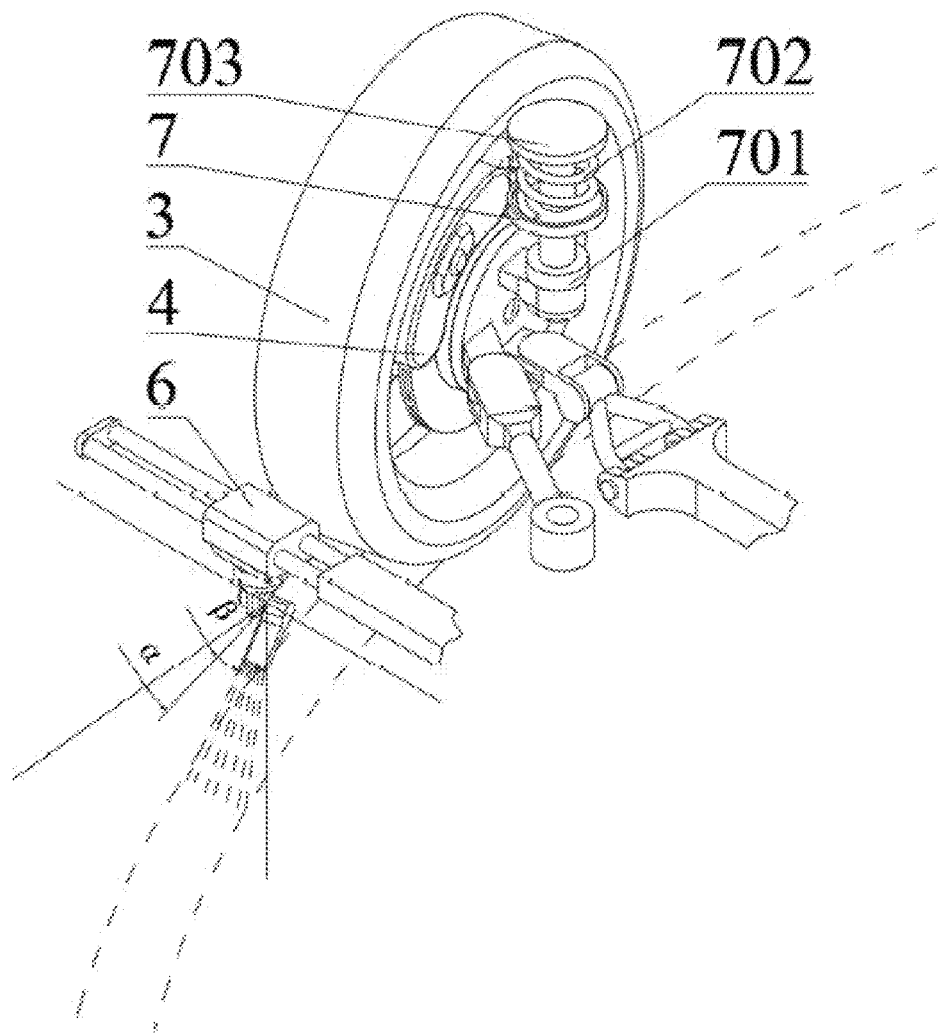
FIG. 3 is a schematic diagram of a wheel motion track in an apparatus of the present disclosure.
Figure 4:
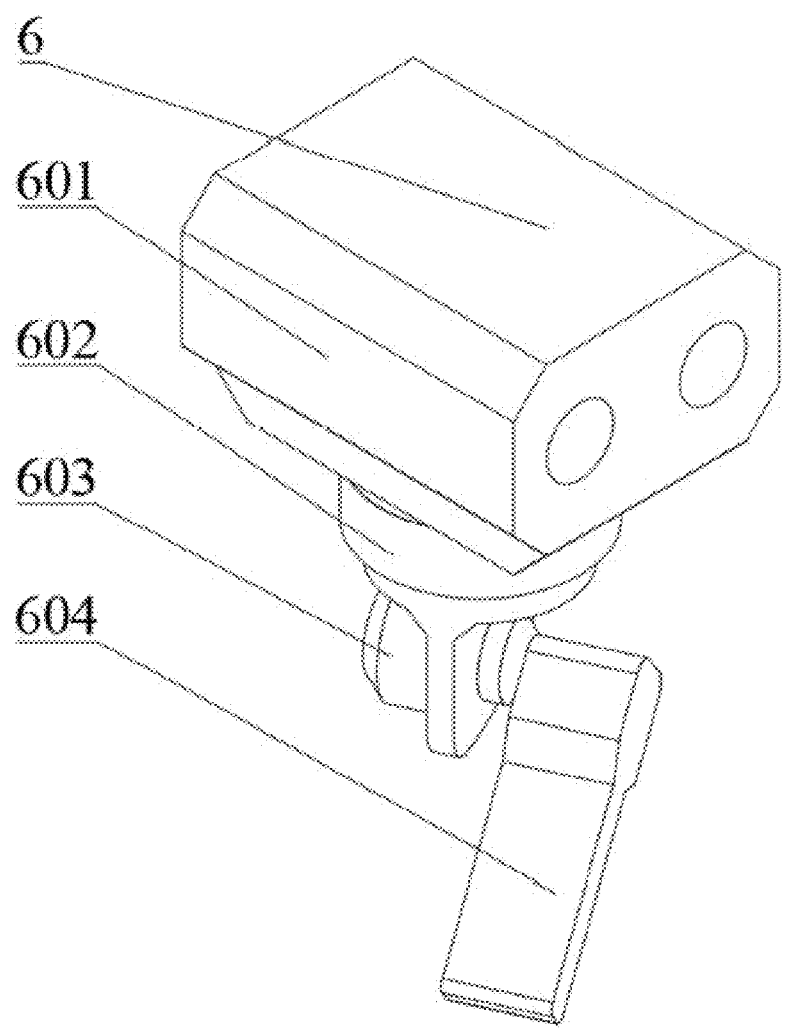
FIG. 4 is a schematic diagram of a distance measuring apparatus in an apparatus of the present disclosure.

where reference signs: 1 Vehicle body, 101 Vehicle cabin floor, 102 Inclination angle sensor, 103 Acceleration sensor, 2 Steering apparatus, 201 Steering wheel, 202 Steering gear, 203 Connecting rod, 204 Steering knuckle, 205 Swing arm, 3 Wheel, 4 Brake apparatus, 401 Brake disc, 402 Brake pad, 403 Force sensor, 5 Vehicle frame, 6 Distance measuring apparatus, 601 Base, 602 Steering motor, 603 Pitching motor, 604 Distance measuring sensor, 7 Active suspension, 701 Hydraulic damping regulator, 702 Spring, 703 Hydraulic cylinder.

DESCRIPTION OF THE EMBODIMENTS

To describe the technical solutions in the embodiments of the present disclosure or in the prior art more clearly, the following will briefly introduce the drawings required for describing the embodiments or the prior art. Apparently, the drawings in the following description show some embodiments of the present disclosure, and other drawings may also be obtained by those of ordinary skill in the art according to these drawings without paying out any creative effort.

It needs to be noted that in the description of the present disclosure, the orientation or position relationship indicated by the terms "upper", "lower", "top", "bottom", "one side", "other side", "left", "right", etc. is the orientation or position relationship shown based on the drawings, which is only for the convenience of describing the present disclosure and simplifying the description, rather than indicating that the apparatus or element must have a specific orientation and be constructed and operated in a specific orientation.

Referring to FIG. 1 to FIG. 4, provided is a specific structure of an embodiment of a wheel action-based active suspension damping adjustment apparatus proposed by the present disclosure, including a vehicle body 1, a steering apparatus 2, wheels 3, brake apparatuses 4, a vehicle frame 5, distance measuring apparatuses 6, and active suspensions 7, the steering apparatus 2 is arranged at a front end of the vehicle body 1, the vehicle frame 5 is arranged below the steering apparatus 2, the brake apparatuses 4 are arranged at two sides of the vehicle frame 5, the active suspensions 7 are arranged at upper parts of the brake apparatuses 4, the wheels 3 are arranged at one side of the active suspensions 7, and the distance measuring apparatuses 6 are arranged in front of the wheels 3;

the vehicle body 1 includes a vehicle cabin floor 101, an inclination angle sensor 102, and acceleration sensors 103, the inclination angle sensor 102 is arranged above the vehicle cabin floor 101, and the acceleration sensors 103 are arranged around the inclination angle sensor 102; the inclination angle sensor 102 measures the changes of an lateral inclination angle and a pitch angle of the vehicle cabin floor 101, and the acceleration sensors 103 are arranged right above the active suspensions 7 and used for measuring a vertical acceleration of the active suspensions 7.

The steering apparatus 2 includes a steering wheel 201, a steering gear 202, connecting rods 203, steering knuckles 204, and swing arms 205, the steering gear 202 is arranged below the steering wheel 201, the connecting rods 203 are arranged at two sides of the steering gear 202, the steering knuckles 204 are arranged at one side of the connecting rods 203, and the swing arms 205 are arranged at one side of the steering knuckles 204.

The brake apparatuses 4 each include a brake disc 401, a brake pad 402, and a force sensor 403, the brake pad 402 is arranged at one side of the brake disc 401, and the force sensor 403 is arranged at one side of the brake pad 402.

The distance measuring apparatuses 6 each include a base 601, a steering motor 602, a pitching motor 603, and a distance measuring sensor 604, the steering motor 602 is arranged below the base 601, the pitching motor 603 is arranged below the steering motor 602, and the distance measuring sensor 604 is arranged at one side of the pitching motor 603. A monitoring area of the distance measuring sensor 604 is controlled by the steering motor 602 to be always located on a traveling route of the wheels 3. The pitching motor 603 controls a pitch angle R of the distance measuring sensor 604. The higher the vehicle speed, the more the traveling distance that needs to be monitored in advance, and the smaller the pitch angle 3. The distance measuring apparatuses 6 are mounted on the vehicle frame 5 through a lead screw-polish rod structure and connected to the steering gear 202 through lead screw-nut structures, and a motion track of the distance measuring apparatuses is controlled by the steering wheel 201, so that the distance measuring apparatuses are always located on the traveling track of the wheels 3.

The acceleration sensors 103 are arranged right above the active suspensions 7, and the inclination angle sensor 102 is arranged at a center of the vehicle cabin floor 101.

The active suspensions 7 each include a hydraulic damping regulator 701, a spring 702, and a hydraulic cylinder 703, the spring 702 is arranged above the hydraulic damping regulator 701, and the hydraulic cylinder 703 is arranged above the spring 702. After collecting various information about the sensors described above, a computer or controller performs damping adjustment on the active suspensions 7.

Figure 5:
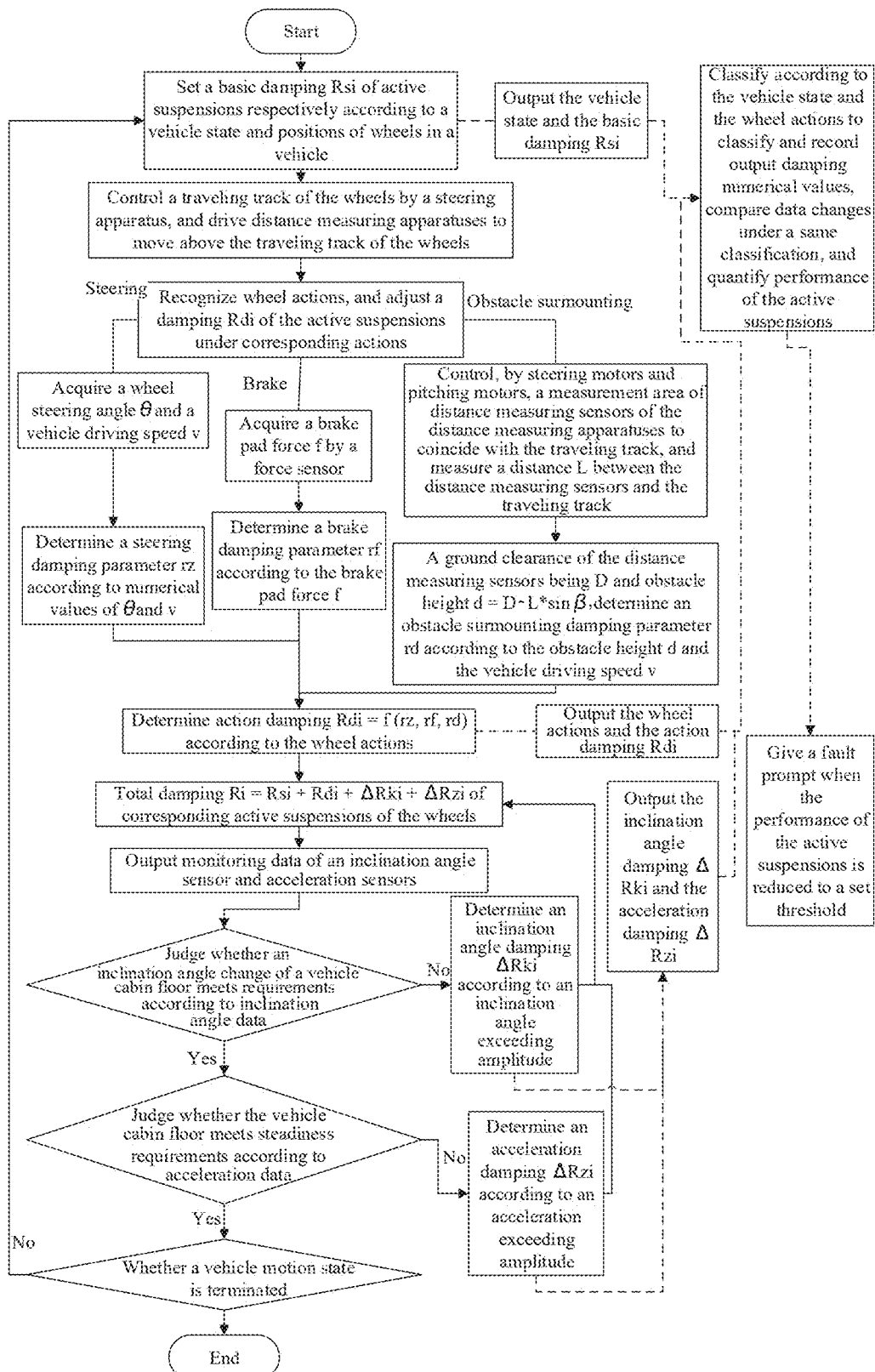
FIG. 5 is a schematic diagram of an operation process of a method of the present disclosure.

Referring to FIG. 5, provided is a wheel action-based active suspension damping adjustment method, including the following steps:

S1: setting a basic damping according to an initial state, wherein vehicle basic data such as a weight of a vehicle body and a weight of a load needs to be considered for the initial state. In this embodiment, a total weight of the vehicle body and the load is 1500 Kg, and hydraulic damping regulators have a maximum damping coefficient of 1800 N·s/m and a minimum damping coefficient of 1000 N·s/m.

S11: setting a basic damping Rsi of an active suspension on each wheel according to the initial state of a vehicle, a positional relationship of wheels in the vehicle and driving requirements, wherein i represents serial numbers of the wheels at different positions in the vehicle. In this embodiment, a basic damping Rsi of an active suspension is 1400 N·s/m.

S12: controlling a traveling track of the wheels by a steering apparatus, and driving distance measuring apparatuses to move above the traveling track of the wheels.

S2: setting an action damping according to a wheel action:

S21: a steering damping parameter acquiring a wheel steering angle θ and a vehicle driving speed v, and determining a steering damping parameter rz according to numerical values of the wheel steering angle θ and the vehicle driving speed v. A determining method is as follows:

Setting the wheel steering angle θ as zero during straight driving, and recording the maximum wheel steering angle as θmax and the maximum steering driving speed as vmax, a control domain of discourse is set as [0, 7] and divided into 7 fuzzy subsets, gaussmf is selected as the type of a membership function, meanwhile, a fuzzy rule is designed according to actual requirements, and the numerical value of the steering damping parameter rz is determined by taking 7θ/θmax and 7v/vmax as two-dimensional inputs and combining with the fuzzy rule.

Figure 6:
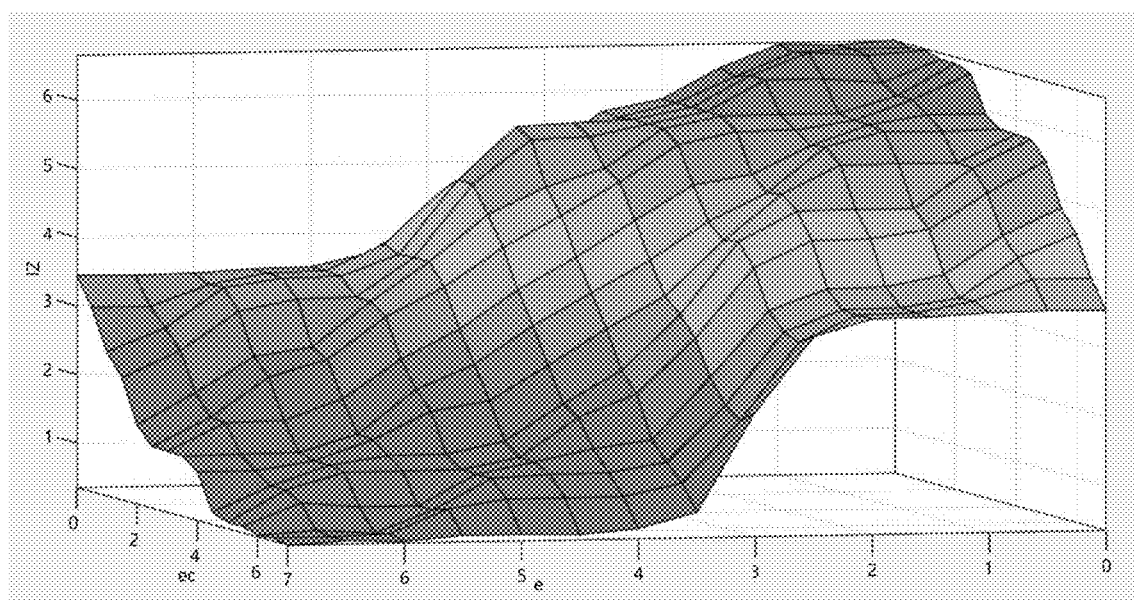
FIG. 6 is a diagram of output results of a steering damping parameter rz based on a fuzzy rule.

The control domain of discourse [0, 7] is evenly divided into 7 fuzzy subsets, recorded as NB, NM, NS, ZE, PS, PM, and PB, 7θ/θmax and 7v/vmax as two-dimensional inputs are recorded as e and ec respectively, and the fuzzy rule is shown in the table 1 below. FIG. 6 is a diagram of output results of a steering damping parameter rz based on a fuzzy rule.

TABLE 1

Fuzzy rule

| | e | | | | | | |
|---|---|---|---|---|---|---|---|
| ec | NB | NM | NS | ZE | PS | PM | PB |
| NB | PB | PB | PM | PS | ZE | ZE | ZE |
| NM | PB | PB | PM | PM | ZE | ZE | NS |
| NS | PB | PM | PM | PS | ZE | NS | NM |
| ZE | PM | PM | PS | ZE | NS | NM | NM |
| PS | PM | PS | PS | NS | NM | NM | NB |
| PM | PS | ZE | ZE | NM | NM | NB | NB |
| PB | ZE | ZE | ZE | NB | NB | NB | NB |

Under a same wheel steering angle θ, an inside turning path and an outside turning path correspond to different steering damping parameters rz of the active suspensions of the wheels, represented as positive and negative respectively; and when only a steering action is present, action damping Rdi=f (rz, 0, 0), and action dampings of the active suspensions of inside and outside paths have a certain difference value, so that vehicle steering is steady.

S22: a brake damping parameter acquiring a brake pad force f by a force sensor, and determining a brake damping parameter rf according to the brake pad force f. A determining method is as follows:

Recording the maximum brake pad force as fmax and the rate of change of the brake pad force as fec, a control domain of discourse of 7f/fmax is set as [0, 7], the rate of change fec is positive or negative, a coefficient K is set such that |K*fec| is less than 3, and thus the control domain of discourse thereof is set as [−3, 3], which is also equally divided into 7 fuzzy subsets, gaussmf is selected as the type of membership function, meanwhile, a fuzzy rule is designed according to actual requirements, and the numerical value of the brake damping parameter rf is determined by taking 7f/fmax and K*fec as two-dimensional inputs and combining with the fuzzy rule.

The fuzzy rule of the brake damping parameters rf is similar to that of the steering damping parameter rz, and 7f/fmax and K*fec as two-dimensional inputs are recorded as e and ec respectively, wherein ec is positive or negative. Therefore, the control domain of discourse of ec as [−3, 3] is also divided into 7 fuzzy subsets, and the rest is similar to the above.

Under a same brake pad force f, front wheels and rear wheels of the vehicle correspond to different brake damping parameters rf of the active suspensions, represented as positive and negative respectively; and when only a brake action is present, action damping Rdi=f (0, rf, 0), and action dampings of the active suspensions of the front wheels and the rear wheels have a certain difference value, achieving better brake performance while ensuring steady vehicle braking.

S23: an obstacle surmounting damping parameter controlling, by steering motors and pitching motors, a measurement area of distance measuring sensors of the distance measuring apparatuses to coincide with the traveling track, measuring a distance L between the distance measuring sensors and the traveling track, a ground clearance of the distance measuring sensors being D and obstacle height d=D−L×sin β, and determining an obstacle surmounting damping parameter rd according to the obstacle height d and the vehicle driving speed v.

The maximum lifting displacement of the active suspensions is dmax, the maximum obstacle surmounting driving speed is vmax, a control domain of discourse of 7v/vmax is set as [0, 7], considering the case where an obstacle is a depression, 3d/dmax is positive or negative, and thus the control domain of discourse thereof is set as [−3, 3], which is also equally divided into 7 fuzzy subsets, gaussmf is selected as the type of membership function, meanwhile, a fuzzy rule is designed according to actual requirements, and the numerical value of the obstacle surmounting damping parameter rd is determined by taking 7v/vmax and 3d/dmax as two-dimensional inputs and combining with the fuzzy rule.

The fuzzy rule and the numerical value determining method of the obstacle surmounting damping parameter rd are similar to those of the steering damping parameter rz and brake damping parameter rf described above.

S24: the wheel action being one or more of S21 to S23, determining action damping $R_{di}$=f(rz, rf, rd) according to acquired damping parameters, and determining total damping $R_i$=$R_{si}$+$R_{di}$+$\Delta R_{ki}$+$\Delta R_{zi}$ of active suspensions, where Δ Rki is an inclination angle damping and Δ Rzi is an acceleration damping.

For acquiring f (rz, rf, rd), firstly, a first simulation data set of action damping Rdi that meets adjustment and control requirements under actions of some wheels is calculated by a model of seven degrees of freedom of the active suspensions of the vehicle, then, an experimental data set of action damping Rdi that meets actual requirements under the actions of the some wheels is acquired by experiments, the first simulation data set and the experimental data set are trained by a first neural network to obtain a first relational model between simulation data and experimental data, and a second simulation data set under actions of more wheels is calculated and combined with the first simulation data set to be trained by a second neural network to acquire a second relational model between wheel actions and simulation data;

and when the action damping Rdi is calculated in actual, parameters rz, rf, and rd are input into the second relational model to obtain a simulation result, then the simulation result is input into the first relational model, and finally, the action damping Rdi adjusted and controlled in actual is determined.

Data included in the first simulation data set, the experimental data set and the second simulation data set include the damping parameters rz, rf, and rd, the action damping Rdi, etc.

The first relational model is a corresponding relationship between simulation data and experimental data, and an acquisition method is as follows: by taking the first simulation data set as an input data set and taking the experimental data set as a target data set, the input data set and the target data set are divided into a training set, a validation set, and a test set in a ratio of 8:1:1, respectively, the training set is used for model learning, the validation set is used for adjusting model parameters, and the test set is used for evaluating model performance.

The training set of the input data set and the training set of the target data set are input into a multilayer perception (MLP) neural network to train models, an output is calculated by forward propagation, then, a loss value is calculated by using a loss function, a network weight is then updated by reverse propagation, when data of a complete training set is subjected to one training, the validation set is used to perform accuracy evaluation on the models, and the model parameters are optimized according to the accuracy, the higher the accuracy, the smaller the adjustment amount of the parameters, until the accuracy reaches the use standard and is generally above 90%.

The test set is used to perform a more comprehensive performance evaluation test on the trained models, and the models passing test can be applied in actual.

The second relational model is a corresponding relation between the parameters rz, rf, and rd and the calculated action damping Rdi, and is also acquired by the MLP neural network, and an acquisition method thereof is similar to that of the first relational model. Due to the reduced data features, constructed MLP neural network parameters are not completely consistent with those of the first relational model, wherein the parameters rz, rf, and rd are used as input data, and the calculated action damping Rdi is used as target data.

S3: determining the inclination angle damping and the acceleration damping:

S31: outputting monitoring data of an inclination angle sensor and acceleration sensors;

S32: judging whether an inclination degree of a vehicle cabin floor meets design requirements according to inclination angle data φ, recording a maximum design inclination angle as φmax, if not, determining an inclination angle damping Δ Rki according to an inclination angle exceeding amplitude |φ−φmax|, wherein inclination angle damping Δ Rki=M*|φ−φmax|, where M is a damping difference of the hydraulic damping regulators, i.e., a difference value between a maximum damping and a minimum damping of the hydraulic damping regulators, and jumping to S24 to simultaneously correct the total damping Ri of the active suspensions at a ground proximity inclination side according to the calculated inclination angle damping Δ Rki.

For the active suspensions of different wheels, it is necessary to consider that the positions of the wheels are adjusted in a linked manner so as to ensure that the inclination angle amplitude of the vehicle cabin floor is reduced. Therefore, the output correction of the inclination damping Δ Rki is performed synchronously for all the active suspensions, but the numerical values of adjustment and control of the inclination damping Δ Rki are different.

S33: judging whether the vehicle cabin floor meets steadiness requirements according to acceleration data a, recording a maximum design inclination angle as amax, if not, determining an acceleration damping Δ Rzi according to an acceleration exceeding amplitude |a−amax|, wherein acceleration damping Δ Rzi=M*|a−amax|, and jumping to S24 to correct the total damping Ri of the active suspensions corresponding to the acceleration sensors.

Since the acceleration sensors are arranged right above the active suspensions respectively, the monitored data of each acceleration sensor is a vertical acceleration of the corresponding active suspension, and during the output correction, the acceleration damping $\Delta R_{zi}$ can be adjusted respectively for the corresponding active suspensions.

S4: judging whether a vehicle motion state is terminated, if yes, ending, and if not, jumping to S1.

A vehicle state, the basic damping Rsi, the wheel action, the action damping Rdi, the inclination angle damping Δ Rki and the acceleration damping Δ Rzi are output respectively, and classified according to the vehicle state and the wheel actions to classify and record output damping numerical values, data changes under a same classification are compared, performance of the active suspensions is quantified, and a fault prompt is given when the performance is reduced to a set threshold. The quantification of the performance of the active suspensions can be implemented by the following method: firstly, data is classified according to the vehicle state and the wheel actions, and initial data (basic damping Rsi, action damping Rdi, inclination angle damping Δ Rki, and acceleration damping Δ Rzi) is recorded at a period T, then the damping data during the use of an automobile is recorded and classified according to the vehicle state and the wheel actions, then the data during the use is compared with the initial data at a period T, and a data fluctuation error is calculated, the performance of the active suspensions is quantified based on the error, and the greater the error, the worse the performance.

The differences between the wheel action-based active suspension damping adjustment apparatus and method of the present disclosure and the apparatus in the prior art lie in that: according to the present disclosure, the steering damping parameter is determined by the wheel steering angle and the vehicle driving speed, the brake damping parameter is determined by the brake pad force, the obstacle surmounting damping parameter is determined by the obstacle height and the vehicle driving speed, the wheel actions are recognized, and the action damping magnitude is calculated according to the damping parameters determined by different wheel actions, the sensors of the present disclosure monitor a smaller volume of data, and the calculation process is simple, so that a quick response requirement can be met, thereby achieving the better adjustment and control effect for a composite scenario of various driving road conditions.

The differences between the wheel action-based active suspension damping adjustment apparatus and method of the present disclosure and the apparatus in the prior art lie in that: according to the present disclosure, the changes in the inclination angle and steadiness of the vehicle cabin floor are monitored by the inclination angle sensor and the acceleration sensors, the inclination angle damping and the acceleration damping are determined according to the exceeding amplitudes, and the total damping of the active suspensions is fed back and corrected, so that the present disclosure takes account of the influence of adjustment and control errors due to different actions between different wheels, thereby achieving the cooperative control of the active suspension apparatus by means of feedback and correction.

The differences between the wheel action-based active suspension damping adjustment apparatus and method of the present disclosure and the apparatus in the prior art lie in that: according to the present disclosure, the basic damping, action damping, inclination angle damping and acceleration damping data is output and recorded, and classified according to the vehicle state and the wheel actions, the data changes under the same classification are compared, the performance of the active suspensions is quantified, and the fault prompt is given according to the change in the performance of the active suspensions.

The embodiments described above merely describe the preferred implementations of the present disclosure, but do not limit the scope of the present disclosure, and without departing from the design spirit of the present disclosure, any modifications and improvements made to the technical solutions of the present disclosure by those skilled in the art shall fall within the scope of protection determined by the claims of the present disclosure.

What is claimed is:

1. A wheel action-based active suspension damping adjustment method, comprising the following steps:
    S1: setting a basic damping according to an initial state, comprising:
    S11: setting a basic damping $Rsi$ of an active suspension on each wheel according to the initial state of a vehicle, a positional relationship of wheels in the vehicle and driving requirements, wherein i represents serial numbers of the wheels at different positions in the vehicle; and
    S12: controlling a traveling track of the wheels by a steering apparatus, and driving distance measuring apparatuses to move above the traveling track of the wheels;
    S2: setting an action damping according to a wheel action, comprising:
    S21: acquiring a wheel steering angle $\theta$ and a vehicle driving speed v, and determining a steering damping parameter rz according to numerical values of the wheel steering angle $\theta$ and the vehicle driving speed v;
    S22: acquiring a brake pad force f by a force sensor, and determining a brake damping parameter rf according to the brake pad force f;
    S23: by adjusting a steering angle $\alpha$ of steering motors and a pitch angle $\beta$ of pitching motors, controlling a measurement area of distance measuring sensors to coincide with the traveling track of the wheels on a road surface, measuring a distance L between the distance measuring sensors and the traveling track on the road surface, a ground clearance of the distance measuring sensors being D and obstacle height $d=D-L\times\sin\beta$, and determining an obstacle surmounting damping parameter rd according to the obstacle height d and the vehicle driving speed v; and
    S24: the wheel action being one or more of S21 to S23, determining action damping $R_{di}=f(rz, rf, rd)$ according to acquired damping parameters, and determining total damping $R_i=R_{si}+R_{di}+\Delta R_{ki}+\Delta R_{zi}$ of active suspensions, wherein $\Delta Rki$ is an inclination angle damping and $\Delta R_{zi}$ is an acceleration damping,
    wherein for acquiring f(rz, rf, rd), firstly, a first simulation data set of action damping Rdi that meets adjustment and control requirements under actions of some wheels is calculated by a mathematical model, then, an experimental data set of action damping Rdi that meets actual requirements under the actions of the some wheels is acquired by experiments, the first simulation data set and the experimental data set are trained by a first neural network to obtain a first relational model between simulation data and experimental data, and a second simulation data set under actions of more wheels is calculated and combined with the first simulation data set to be trained by a second neural network to acquire a second relational model between wheel actions and simulation data; and when the action damping Rdi is calculated in actual, parameters rz, rf, and rd are input into the second relational model to obtain a simulation result, then the simulation result is input into the first relational model obtain an experimental result, and finally, the action damping Rdi adjusted and controlled in actual is determined;
    S3: determining the inclination angle damping and the acceleration damping, comprising:
    S31: outputting monitoring data of an inclination angle sensor and acceleration sensors;
    S32: judging whether an inclination change of a vehicle cabin floor meets requirements according to inclination angle data, if not, determining an inclination angle damping $\Delta$ Rki according to an inclination angle exceeding amplitude, and jumping to S24 to correct the total damping Ri of the active suspensions; and
    S33: judging whether the vehicle cabin floor meets steadiness requirements according to acceleration data, if not, determining an acceleration damping $\Delta$ Rzi according to an acceleration exceeding amplitude, and jumping to S24 to correct the total damping Ri of the active suspensions; and
    S4: judging whether a vehicle motion state is terminated, if yes, ending, and if not, jumping to S1.

2. The wheel action-based active suspension damping adjustment method according to claim 1, wherein in step S21, under a same wheel steering angle $\theta$, an inside turning path and an outside turning path correspond to different steering damping parameters rz of the active suspensions of the wheels, represented as positive and negative respectively; and when only a steering action is present, action damping Rdi=f(rz, 0, 0), and action dampings of the active suspensions of inside and outside paths have a certain difference value, so that vehicle steering is steady.

3. The wheel action-based active suspension damping adjustment method according to claim 1, wherein in step S22, under a same brake pad force f, front wheels and rear wheels of the vehicle correspond to different brake damping parameters rf of the active suspensions, represented as positive and negative respectively; and when only a brake action is present, action damping Rdi=f(0, rf, 0), and action dampings of the active suspensions of the front wheels and the rear wheels have a certain difference value, achieving better brake performance while ensuring steady vehicle braking.

4. The wheel action-based active suspension damping adjustment method according to claim 1, wherein a vehicle state, the basic damping Rsi, the wheel actions, the action damping Rdi, the inclination angle damping $\Delta$ Rki and the acceleration damping $\Delta$ Rzi are output respectively, and classified according to the vehicle state and the wheel actions to classify and record output damping numerical values, data changes under a same classification are compared, performance of the active suspensions is quantified, and a fault prompt is given when the performance is reduced to a set threshold.

5. The wheel action-based active suspension damping adjustment method according to claim 1, wherein a wheel action-based active suspension damping adjustment apparatus comprises a vehicle body, the steering apparatus, the wheels, brake apparatuses, a vehicle frame, the distance measuring apparatuses, and the active suspensions, the steering apparatus is arranged at a front end of the vehicle body, the vehicle frame is arranged below the steering apparatus, the brake apparatuses are arranged at two sides of the vehicle frame, the active suspensions are arranged at upper parts of the brake apparatuses, the wheels are arranged at one side of the active suspensions, and the distance measuring apparatuses are arranged in front of the wheels, wherein
    the vehicle body comprises the vehicle cabin floor, the inclination angle sensor, and the acceleration sensors, the inclination angle sensor is arranged above the vehicle cabin floor, and the acceleration sensors are arranged around the inclination angle sensor;
    the steering apparatus comprises a steering wheel, a steering gear, connecting rods, steering knuckles, and swing arms, the steering gear is arranged below the steering wheel, the connecting rods are arranged at two sides of the steering gear, the steering knuckles are arranged at one side of the connecting rods, and the swing arms are arranged at one side of the steering knuckles;
    the brake apparatuses each comprise a brake disc, a brake pad, and a force sensor, the brake pad is arranged at one side of the brake disc, and the force sensor acquiring a brake pad force is arranged at one side of the brake pad;
    the distance measuring apparatuses each comprise a base, a steering motor, a pitching motor, and a distance measuring sensor, the steering motor is arranged below the base, the pitching motor is arranged below the steering motor, and the distance measuring sensor is arranged at one side of the pitching motor; and
    the active suspensions each comprise a hydraulic damping regulator, a spring, and a hydraulic cylinder, the spring is arranged above the hydraulic damping regulator, and the hydraulic cylinder is arranged above the spring.

6. The wheel action-based active suspension damping adjustment method according to claim 5, wherein the acceleration sensors are arranged right above the active suspensions, and the inclination angle sensor is arranged at a center of the vehicle cabin floor.

7. The wheel action-based active suspension damping adjustment method according to claim 5, wherein the distance measuring apparatuses are mounted on the vehicle frame through a lead screw-polish rod structure and connected to the steering gear through lead screw-nut structures, and a motion track of the distance measuring apparatuses is controlled by the steering wheel, so that the distance measuring apparatuses are always located on the traveling track of the wheels.

\* \* \* \* \*